(12) United States Patent
Witsch

(10) Patent No.: US 12,459,134 B2
(45) Date of Patent: Nov. 4, 2025

(54) GRIPPING DEVICE FOR TRANSFERRING A MAGNETIC DIPOLE ROD

(71) Applicant: Bayer Aktiengesellschaft, Leverkusen (DE)

(72) Inventor: Daniel Witsch, Solingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 36 days.

(21) Appl. No.: 17/998,010

(22) PCT Filed: Apr. 30, 2021

(86) PCT No.: PCT/EP2021/061379
§ 371 (c)(1),
(2) Date: Nov. 4, 2022

(87) PCT Pub. No.: WO2021/224123
PCT Pub. Date: Nov. 11, 2021

(65) Prior Publication Data
US 2023/0173689 A1    Jun. 8, 2023

(30) Foreign Application Priority Data
May 7, 2020 (DE) ...................... 10 2020 002 745.8

(51) Int. Cl.
*B25J 15/06* (2006.01)
*B25J 9/16* (2006.01)
*B01F 33/452* (2022.01)

(52) U.S. Cl.
CPC ......... *B25J 15/0608* (2013.01); *B25J 9/1664* (2013.01); *B01F 33/452* (2022.01)

(58) Field of Classification Search
CPC .................................................. B25J 15/0608
(Continued)

(56) References Cited

U.S. PATENT DOCUMENTS

| 2,599,966 A | 6/1952 | Alexis |
| 2,656,211 A | 10/1953 | Alexis |

(Continued)

FOREIGN PATENT DOCUMENTS

| CN | 106272510 A | 1/2017 |
| CN | 206593935 U | 10/2017 |

(Continued)

OTHER PUBLICATIONS

International Search Report received in international application No. PCT/EP2021/061379, mailed Sep. 3, 2021.

(Continued)

*Primary Examiner* — Gerald McClain

(57) ABSTRACT

The disclosure relates to a gripping device for transferring a magnetic dipole rod as well as to a robot with a robot arm, to which the gripping device is attached. The disclosure furthermore relates to a magazine for providing one or more magnetic dipole rods, to a system for transferring a magnetic dipole rod, and to the use of the system. The gripping device for a magnetic dipole rod has a metal bolt made of a ferromagnetic material, the diameter of which is smaller than the diameter of the magnetic dipole rod. The metal bolt can assume at least two different positions, wherein the dipole rod adheres to the front end of the metal bolt in the first position and is stripped off from the front end of the metal rod during the transition into the second position.

10 Claims, 5 Drawing Sheets

(58) Field of Classification Search
USPC ........................................................ 294/65.5
See application file for complete search history.

(56) References Cited

U.S. PATENT DOCUMENTS

| | | | |
|---|---|---|---|
| 4,943,098 A | 7/1990 | Aoyama | |
| 5,433,492 A | 7/1995 | Glossop | |
| 6,056,339 A | 5/2000 | Berger | |
| 6,079,091 A * | 6/2000 | Bove | B23P 19/04 |
| | | | 29/213.1 |
| 6,447,729 B1 | 9/2002 | Tuunanen | |
| 2006/0119119 A1* | 6/2006 | Molteni | H01F 7/206 |
| | | | 294/65.5 |
| 2008/0315055 A1* | 12/2008 | Feng | B25J 15/0608 |
| | | | 248/309.4 |
| 2009/0144968 A1* | 6/2009 | Ulrich | H01L 21/6838 |
| | | | 294/64.2 |
| 2015/0273468 A1* | 10/2015 | Croquette | B01L 3/50825 |
| | | | 422/550 |
| 2017/0222506 A1* | 8/2017 | Silke | B25J 15/0608 |

FOREIGN PATENT DOCUMENTS

| | | |
|---|---|---|
| CN | 107435023 A | 12/2017 |
| DE | 102010040642 A1 | 3/2012 |
| DE | 202018102669 U1 | 5/2018 |
| JP | H10109757 A | 4/1998 |
| WO | 9311913 A1 | 6/1993 |
| WO | 2018024737 A1 | 2/2018 |

OTHER PUBLICATIONS

German Search Report for German application No. BHC201005-DE, mailed Jan. 27, 2021.

* cited by examiner

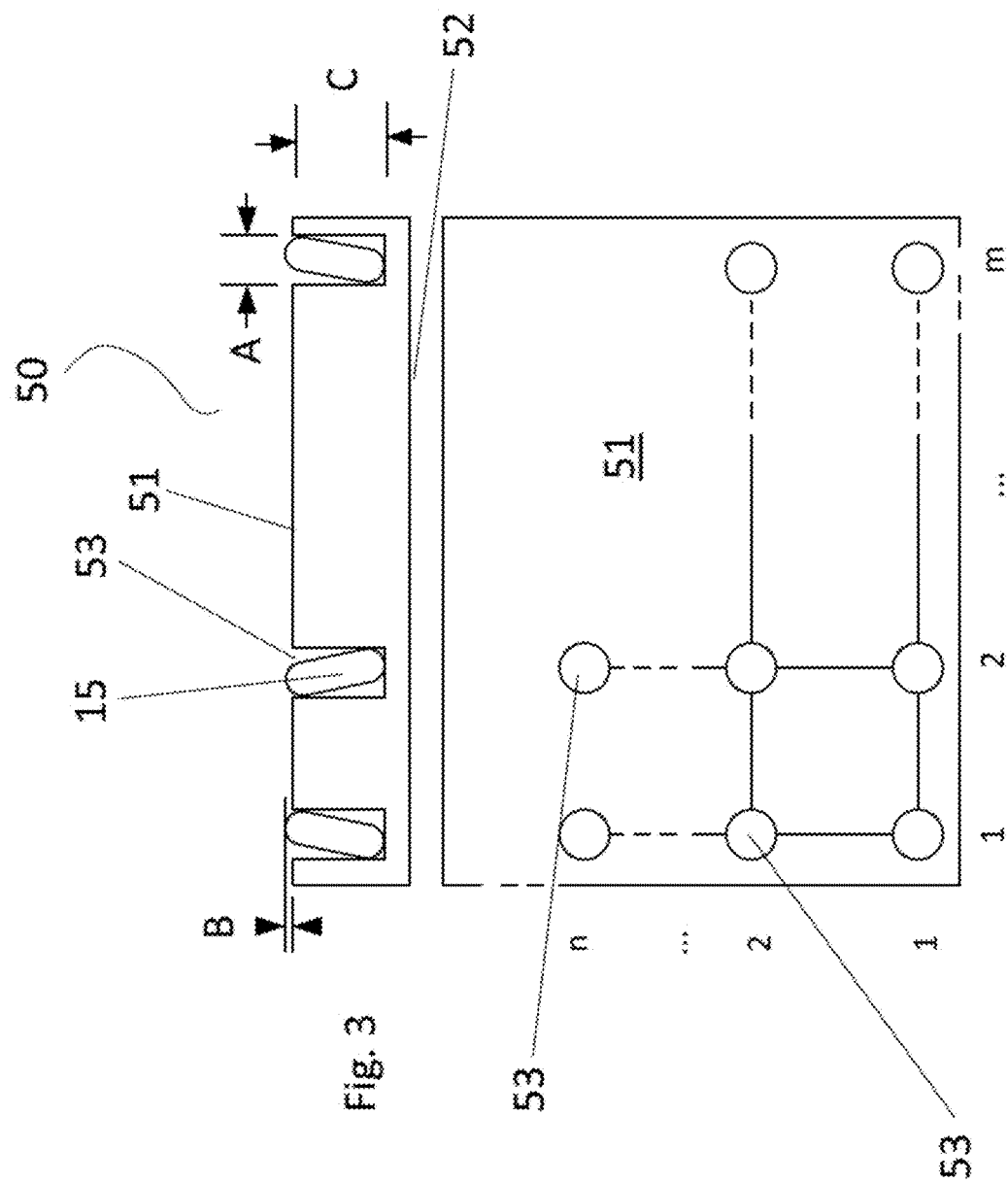

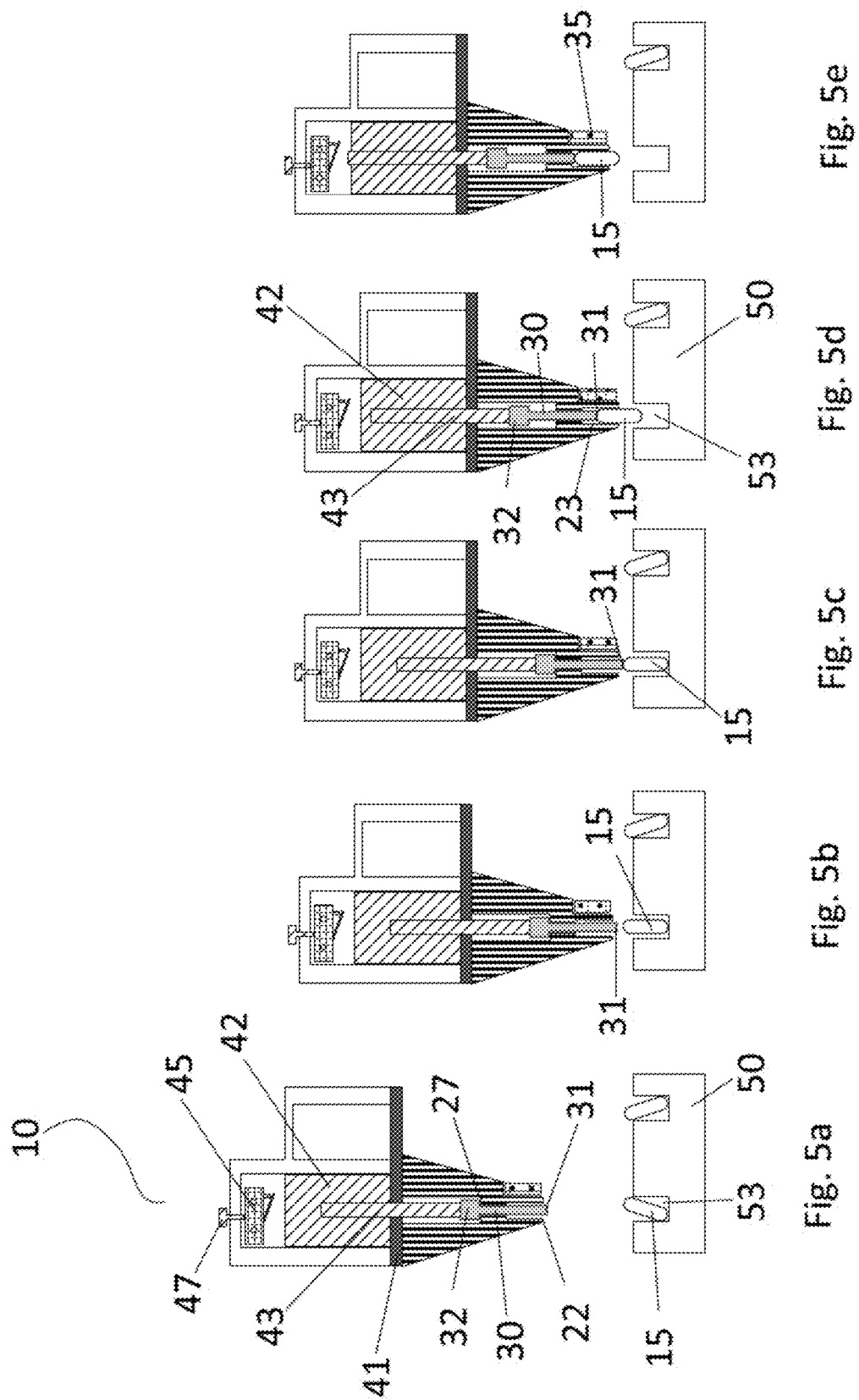

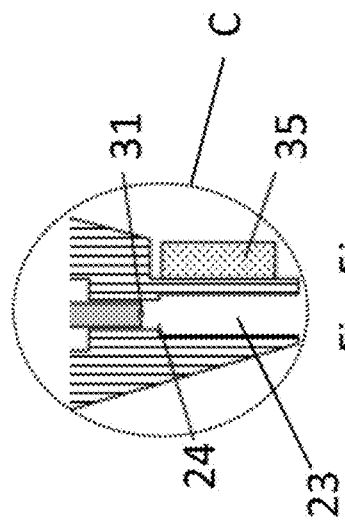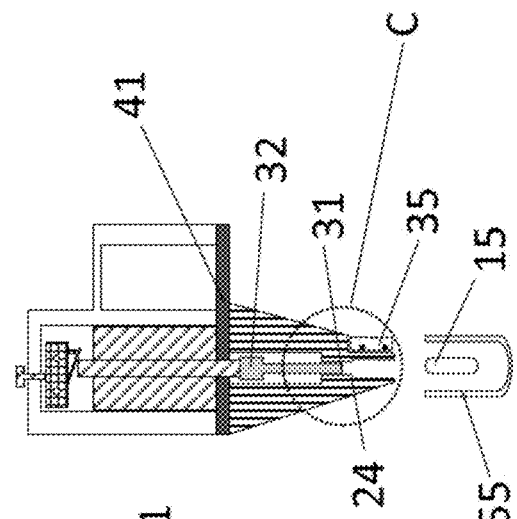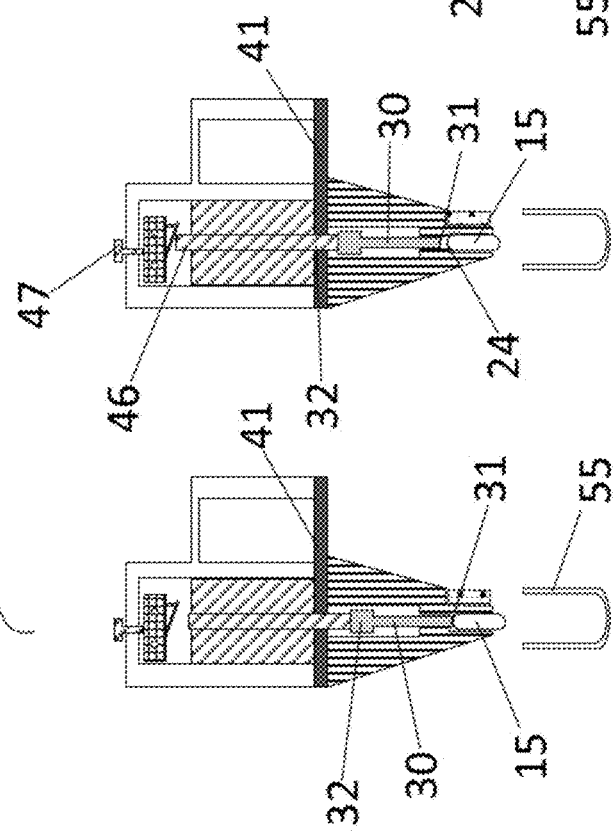

GRIPPING DEVICE FOR TRANSFERRING A MAGNETIC DIPOLE ROD

CROSS-REFERENCE TO RELATED APPLICATIONS

This application is the National Stage entry of International Application No. PCT/EP2021/061379, filed 30 Apr. 2021, which claims priority to Germany No. 102020002745.8, filed 7 May 2020.

BACKGROUND

Field

The invention relates to a gripping device for transferring a magnetic dipole rod as well as to a robot with a robot arm, to which the gripping device is attached. The invention furthermore relates to a magazine for providing one or more magnetic dipole rods, to a system for transferring a magnetic dipole rod, and to the use of the system.

Description of Related Art

For many chemical experiments, the mixing of liquids with a magnetic stirrer is the preferred method for ensuring good mixing. The liquid is placed in one or more sample containers on a plate, under which a magnet rotates at a controllable speed. This magnet acts on a second, usually rod-shaped magnet, the magnetic dipole rod, located in the sample container and sets the liquid in motion via the said rod. The magnetic dipole rod is usually encased in plastic, e.g. PTFE, or glass in order to reduce friction and make it chemically inert.

In everyday laboratory practice, many sample containers are nowadays prepared in parallel for tests. In this process, microtitre plates, each of which has around a hundred or even more wells, play a major role. A typical example are 96-well microtitre plates. The wells of a microtitre plate are each supplied with a liquid sample. This is done automatically throughout in order to cope with a high throughput in a short time.

It is difficult to handle magnetic dipole rods in automated processes since, depending on the design, they may be very small, e.g. just 10 mm long with a diameter of 3 mm. Their surface is generally slippery since they are coated with Teflon, for example. In addition, a number of magnetic dipole rods adhere to one another owing to their magnetism. The magnetic properties, in particular, do not allow any of the customary separation methods, for example by means of vibratory feeders or sorting screws. Moreover, because of their small size, reliable handling of the magnetic dipole rods by universal mechanical-clamping grippers is difficult. In addition, there is the fact that pre-fitting sample containers with magnetic dipole rods manually may not be possible, depending on the process. Owing to the magnetism of the magnetic dipole rods, laboratory equipment (e.g. scales) will be disturbed if after the positioning of the magnetic dipole rods in the sample container, the predetermined amount of liquid sample is introduced.

Various types of robots have been in use for several years in the automation of processes in the laboratory, for example in the field of medical technology or analysis or in the field of molecular biology and human diagnostics. The systems in question are predominantly systems in which an actuating end of the robot arm is arranged so as to be linearly movable along three spatial axes running substantially orthogonally to one another (Cartesian XYZ systems). Such systems are sold by Tecan, Beckmann, Canberra Packard and Rosys, for example, in various designs with different numbers of robot arms. In addition, however, there are also systems on sale in which a robot arm holder can be moved linearly along a rail. An upper arm part of the robot arm is arranged pivotably on this robot arm holder, and a lower arm part of the robot arm is arranged pivotably on the upper arm part. Such systems are offered by CRS in Canada and by Zymark in the USA, for example, and are well established in the laboratory sector. Other known robot types which are suitable in conjunction with the invention are the horizontal jointed arm robot (SCARA robot=Selective Compliance Assembly Robot Arm) (manufacturers: ABB Robotics, Dürr AG, Bosch Rexroth, Adept Technology, KUKA AG, for example) or an articulated arm robot.

In all these systems, it must be possible to couple the robot arm to a whole series of different functional units in order to be able to process the samples in the desired manner

SUMMARY

It is the object of the present invention to provide a gripping device for connection to a robot arm which is known per se and which is suitable for handling magnetic dipole rods in an automated manner in order in this way to make sample preparation more effective.

According to the invention, this object is achieved by a gripping device for a magnetic dipole rod, a robot having a gripping device for a magnetic dipole rod, a magazine for providing magnetic dipole rods, and a system for transferring a magnetic dipole rod, as well as the use thereof.

DETAILED DESCRIPTION OF A PREFERRED EMBODIMENT

Gripping Device

The gripping device for a magnetic dipole rod has a ferromagnetic metal bolt. The diameter of the metal bolt is smaller than the diameter of the magnetic dipole rod. At the front end of the metal bolt, there is an adhesion region for the magnetic dipole rod. The adhesion between the metal bolt and the magnetic dipole rod is effected by the magnetic force. The adhesion region is distinguished from the other regions of the metal bolt solely by the fact that only the adhesion region comes into contact with the magnetic dipole rod. The metal bolt can assume at least two different positions, wherein the dipole rod adheres to the front end of the metal bolt in the first position and is stripped off from the front end of the metal bolt during the transition into the second position.

Preferably, the metal bolt is movably mounted in a channel and can be moved in its longitudinal direction between the first position, the receiving position, and the second position, the delivery position, for the magnetic dipole rod. As an option, the metal bolt can assume a holding position, which lies between the receiving position and the delivery position.

The channel is situated in a housing and has an open end. The channel has a section, referred to as the bolt guide section, the diameter of which is smaller than the diameter of the magnetic dipole rod. The diameter of the bolt guide section is matched to the diameter of the metal bolt in such a way that the latter is movable in the bolt guide section and is guided by the walls of the bolt guide section.

In the receiving position, the adhesion region of the metal bolt is situated in the region of the open end of the channel and, in the delivery position, the adhesion region is situated in the bolt guide section.

When the front end of the metal bolt is situated in the region of the open end of the channel and the adhesion region comes into the vicinity of a magnetic dipole rod, the magnetic dipole rod remains stuck to the adhesion region of the metal bolt on account of the magnetic force. If the metal bolt is retracted in the channel and brought into the second position, in which the adhesion region is situated in the bolt guide section, the magnetic dipole rod cannot follow and is separated from the adhesion region.

In a preferred embodiment, there is, between the open end of the channel and the bolt guide section, a section, referred to as the receiving section, the diameter of which is matched to the diameter of the magnetic dipole rod in such a way that the latter can be received into the receiving section with sufficient clearance. The diameter of the receiving section is preferably dimensioned in such a way that the diameter of the receiving section is from 102% to 120% of the diameter of the magnetic dipole rod. The reduction of the diameter of the channel from the receiving section to the bolt guide section results in an edge, which is referred to below as the stripping edge. The length of the receiving section is preferably dimensioned in such a way that the length of the receiving section is in a range of from 80 to 150% of the length of the magnetic dipole rod. In this embodiment, the metal bolt can also assume a position in the channel in which the adhesion region is situated in the receiving section. This is the holding position.

The rear end of the metal bolt is connected to a means for producing a translational movement for advancing and retracting the metal bolt in the channel. The means for producing the translational movement may comprise a linear motor, a stepping motor or a servo motor, possibly with a corresponding transmission.

In a further embodiment, the rear end of the metal bolt has a widening of its diameter, it being possible for the metal bolt to have a circular, square, octagonal or any other desired cross section in the region of the widening. In this case, the bolt guide section is adjoined in the channel by what is referred to as a retraction section, which has an enlarged diameter, corresponding to the widening, in comparison with the bolt guide section and a cross section appropriately matched to the metal bolt, resulting in an edge, which is referred to below as the stop edge, between the retraction section and the bolt guide section. In the receiving position, one side of the widening would then rest against the stop edge and define the maximum possible movement of the metal bolt in the direction of the open end of the channel. Furthermore, the connection to a motor shaft, for example a screw thread, can also be situated in the widening of the metal bolt.

As an option, a sensor or switch that responds to a magnetic field can be mounted on the outside of the housing in the region of the receiving section of the channel in order to detect whether there is a magnetic dipole rod in the receiving section. Such a switch can be a reed contact, for example.

The gripping device can be connected to the arm of a robot in a fixed or removable manner Robot The invention also relates to a robot with a robot arm, to which the above-described gripping device is attached in a fixed or removable manner. The robot preferably comprises a control system for controlling the robot arm and the gripping device.

Control is effected via a control system/controller with programmed control logic which is connected via known electronic communication possibilities to the robot arm, on the one hand, and to the electronic components of the gripping device, on the other hand. The control system comprises a processor, a memory and the communication component. The positions of the magazine and of the wells are also stored, as are the target positions to which the magnetic dipole rods are to be transported.

The movement of the metal bolt in the various phases of the transfer of the magnetic dipole rod is controlled by an interaction between a sensor system connected to the motor and the motor control. A position controller is used for this purpose. An initial position of the motor and thus of the metal bolt is determined by means of an end position sensor, and on this basis the motor moves the metal bolt into the receiving position, holding position and delivery position after appropriate activation by the motor control electronics. The initial position can correspond to the delivery position.

If a magnetic sensor is mounted on the outside of the channel in the region of the receiving section, its signals are likewise processed by means of the control logic.

Magazine

The magnetic dipole rods are preferably provided in a magazine. The magazine comprises a plate made of a non-magnetic material with a top side and a bottom side. The diameter of the wells is dimensioned in such a way that the magnetic dipole rods stand more or less upright in the wells, that is to say have a large clearance. For this purpose, the diameter of the wells should be in a range of from 105% to 220% of the diameter of the magnetic dipole rods. The larger the diameter of the wells, the easier and faster the manual loading of the magazine. The diameter of the wells should preferably be in a range of from 1 mm to 2.5 mm greater than the diameter of a magnetic dipole rod.

The depth of the wells should preferably be in a range of from 0.5 mm to 2.5 mm less than the length of a magnetic dipole rod.

The wells in the magazine are preferably arranged in regular rows and columns. In this case, a minimum spacing of the individual wells with respect to one another should be maintained to ensure that several magnetic dipole rods are not simultaneously attracted by the metal bolt of the gripping device when the latter is situated above a well. The minimum spacing should be greater, the greater the magnetic strength of the magnetic dipole rods. The diameter of the magnetic dipole rods provides a certain orientation. The minimum spacing of the individual wells with respect to one another should correspond to at least three times, preferably four times and particularly preferably five times, the diameter of a magnetic dipole rod.

System

The invention furthermore relates to a system for transferring a magnetic dipole rod, having an above-described robot with a robot arm, to which the gripping device according to the invention is attached, and an above-described magazine.

Use

To carry out a transfer of a magnetic dipole rod into a target container, use is made of the system for transferring a magnetic dipole rod, having an above-described robot with a robot arm, to which the gripping device according to the invention is attached, and an above-described magazine.

The transfer is carried out as described below:

The robot arm is used to move the gripping device with the open end of the channel over a well of the magazine in which there is a magnetic dipole rod. The metal bolt is in the receiving position. When the open end of the channel and thus the front end of the metal bolt is situated in the immediate vicinity of the well, the magnetic dipole rod is aligned vertically. If the spacing between the front end of the metal bolt and the magnetic dipole rod falls below a minimum, one end of the magnetic dipole rod adheres to the adhesion region at the front end of the metal bolt. The metal bolt is then retracted into the holding position and thus pulls the magnetic dipole rod into the receiving section of the channel. If there is a magnetic sensor on the outside of the receiving section, it would now detect the presence of the magnetic dipole rod in the channel. The robot arm moves the gripping device over the target position. The metal bolt is now retracted into the delivery position. During this process, the magnetic dipole rod strikes against the stripping edge and is separated from the adhesion region at the front end of the metal bolt.

Following the force of gravity, the magnetic dipole rod falls vertically into the target position. Any magnetic sensor that might be present would now detect that there is no longer a magnetic dipole rod in the receiving section.

In this way, magnetic dipole rods can be successively transferred from the magazine to a target position.

The transfer of magnetic dipole rods can be carried out automatically with a system according to the invention.

FIGURES AND EXAMPLES

The present invention provides a possibility for automated sample preparation with magnetic dipole rods, which can be carried out with a robot. The invention is explained in greater detail using an exemplary embodiment and with reference to the attached drawings.

FIG. 3 shows a side view of a magazine for magnetic dipole rods;

FIG. 4 shows a plan view of a magazine for magnetic dipole rods;

FIGS. 5*a*-5*i* show the mode of operation of the gripping device

REFERENCE SIGNS

Figure 1:
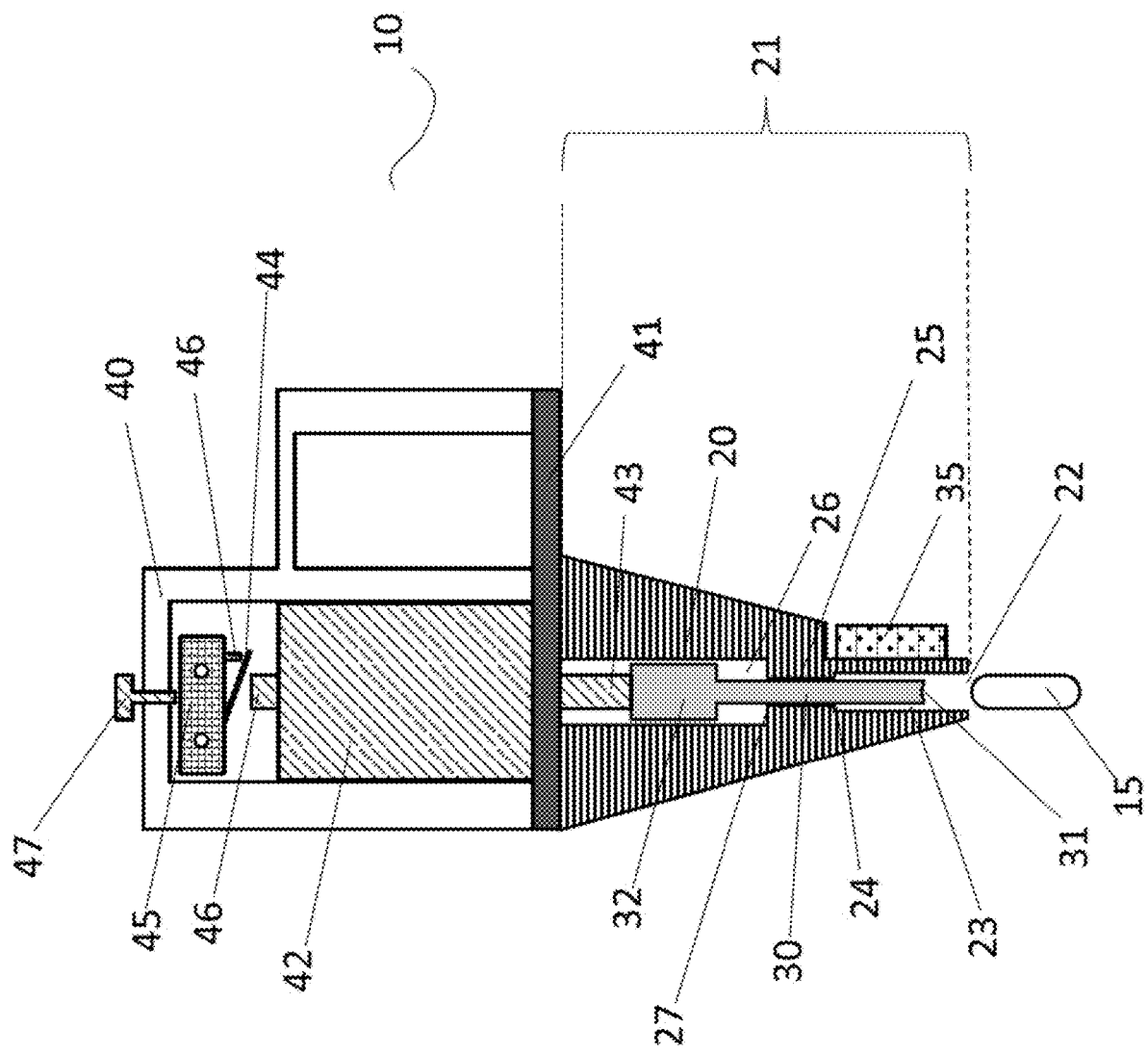
FIG. 1 shows a gripping device according to the invention.

10—gripping device
15—magnetic dipole rod
20—bolt housing
21—channel
22—open end
23—receiving section
24—stripping edge
25—bolt guide section
26—retraction section
27—stop edge
30—metal bolt
31—adhesion region
32—connection
35—magnetic sensor
40—motor housing
41—connecting plate
42—motor
43—motor shaft
46—end piece
45—microswitch
44—actuating lever
46—contact
47—adjusting screw
50—magazine
51—top side
52—bottom side
53—well
55—target vessel
60—control system
61—control logic
62—position controller
64—digital input electronics
65—motor control electronics
66—digital input electronics
67—end position sensor
422—linear motor
355—reed sensor
70—robot arm FIG. 1 shows the gripping device 10 according to the invention. It comprises a bolt housing 20, a connecting plate 41, to which the bolt housing 20 is attached, and a motor housing 40, which is attached to the opposite side of the connecting plate 41 from the bolt housing 20.

The bolt housing 20 has a channel 21 which is subdivided into three sections: receiving section 23, bolt guide section 25 and retraction section 26. The channel has an open end 22 on one side, and its side opposite the open end 22 ends at the connecting plate 41. The dimensions of the receiving section are such that it can accommodate a magnetic dipole rod 15 with sufficient clearance. Sufficient clearance means that the diameter of the receiving section is dimensioned in such a way that it corresponds to the maximum diameter of a dipole rod 15, taking into account the statistical scatter of the underlying production process of the dipole rods 15 used and any adhering impurities, plus an air gap of at least 0.2 mm.

Since the diameter of the receiving section 23 is greater than the diameter of the bolt guide section 25, there is a stripping edge 24 between the receiving section 23 and the bolt guide section 25. The stripping edge 24 prevents the magnetic dipole rod 15 from being introduced into the bolt guide section 25. In the embodiment shown here, the diameter of the retraction section 26 is greater than the diameter of the bolt guide section 25, and therefore a stop edge 27 is formed between the retraction section 26 and the bolt guide section 25. There is a magnetic sensor 35 on the outside of the bolt housing 20 in the region of the receiving section.

A metal bolt 30 is movably mounted in the channel 21. The front end of the metal bolt 30, which points to the open end of the channel 22, is referred to below as the adhesion region 31. Since the metal bolt 30 consists of a ferromagnetic material, a magnetic dipole rod 15 can adhere to the adhesion region 31. The opposite end of the metal bolt 30 from the adhesion region 31 forms the connection 32 to the motor shaft 43. In the embodiment shown, the metal bolt 30 has an enlarged diameter (widening) in the region of the connection 32 to the motor shaft 43. This is matched to the inside diameter of the retraction section 26 and allows a maximum movement of the metal bolt 30 in the direction of the open end of the channel 21 up to the position at which the connection 23 to the motor shaft 43 strikes against the stop edge 27. In this position, the adhesion region 31 is in the region of the open end 22 of the channel 21 (FIGS. 5*a*-*c*).

The motor housing 40 is situated on the opposite side of the connecting plate 41 from the bolt housing 20. The connecting plate 41 has an opening (not shown here), through which the motor shaft 43 projects into the retraction section 26 of the channel 21.

Figure 2:
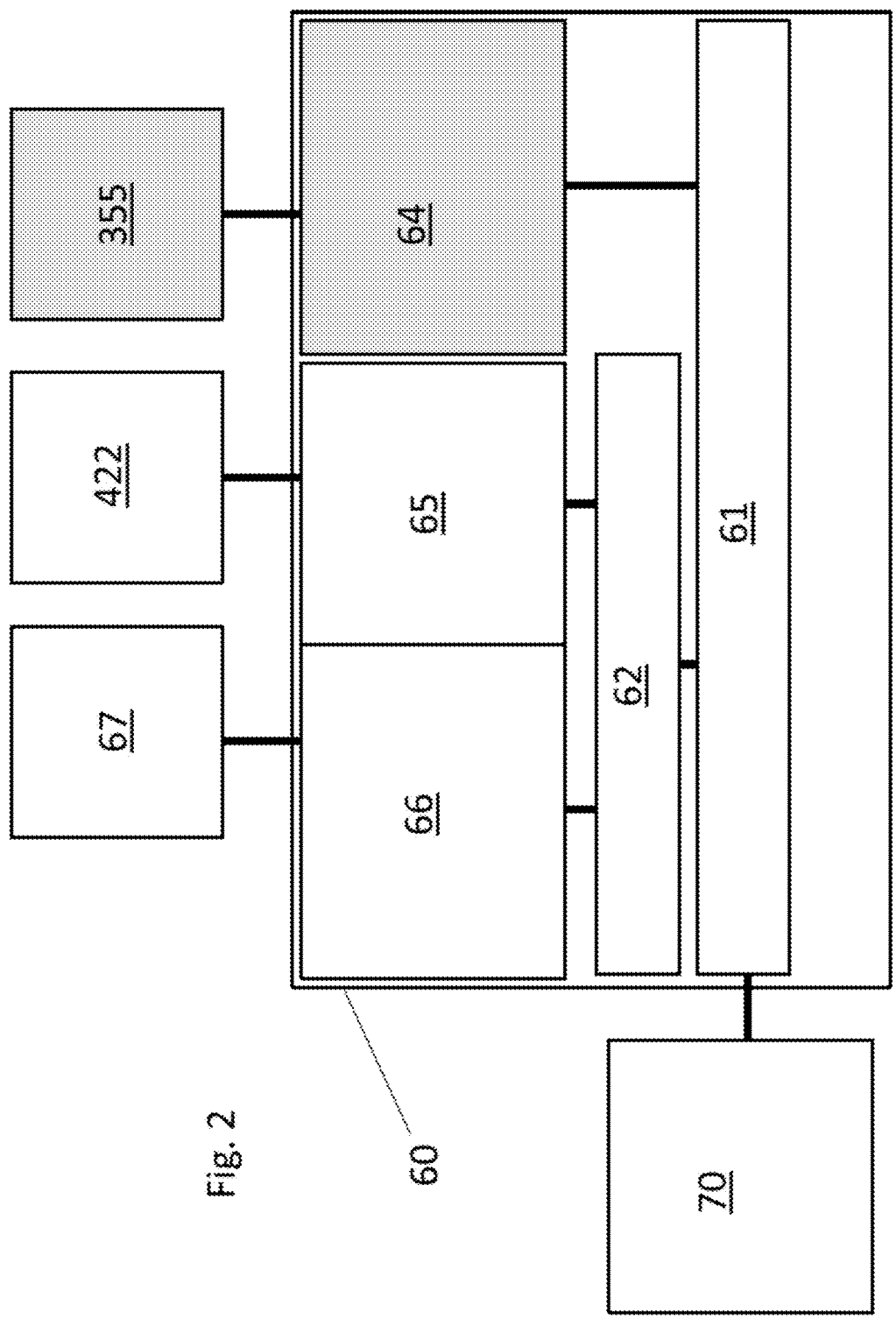
FIG. 2 shows a control system for the gripping device.

The motor housing 40 has a motor 42 with a motor shaft 43 as well as a microswitch 45 and some of the electronic components according to FIG. 2 (the latter are not shown). The microswitch has an actuating lever 44, which can be connected to a contact 46 when pressure is applied to the actuating lever. The microswitch 45 is arranged in the region of the end piece 46 of the motor shaft 43 in such a way that the end piece 46 of the motor shaft 43 actuates the microswitch 45 by pressure on the actuating lever 44 in a specific retracted position of the motor shaft 43. This retracted position can be adjusted by means of the adjusting screw 47. The distance between the motor 42 and the microswitch 45 can be adjusted with the adjusting screw 47.

During a first adjustment travel of the motor 42, the motor shaft 43 is brought into the retracted position, in which the microswitch 45 is actuated by pressure on the actuating lever 44. As soon as the controller receives this signal, this position of the motor shaft 43 is stored as the zero position of the shaft. All the movement steps of the motor shaft 43 are calculated from this zero position. The motor 42 or the motor controller detects the current position of the motor on the basis of the incremental encoder/motor or the internal position controller (without sensor).

FIG. 2 provides an overview of the control system 60 for the gripping device 10 according to the invention. It comprises a processor and a memory, which are not shown separately. The processor is suitable for executing a program code which controls the gripping device 10 in accordance with the sequence shown in FIGS. 5*a-h*. Corresponding programming is familiar to a person skilled in the art.

The program code contains the control logic 61. The latter coordinates the control commands to the robot arm 70, to which the gripping device 10 is connected, and the position controller 62 for the motor 42, which moves the metal bolt 30. In the exemplary embodiment, the motor 42 is a linear motor 422. The position controller receives signals from the end position sensor 67 via the digital input electronics 66. The end position sensor 67 is nothing other than the functional description of the microswitch 45. The position of the motor shaft 43 or of the end piece 46 of the motor shaft 43 in which the latter makes contact with the microswitch 45 is the initial position/end position for the movement of the motor 42, 422 and thus of the metal bolt 30 into the various predetermined positions, such as the receiving position, the holding position and the delivery position. In the embodiment shown here, the end position corresponds to the delivery position of the metal bolt 30. By means of the adjusting screw 47, these different positions can be adjusted, i.e. pushed forward or backward. The position controller controls the linear motor 422 and thus the positioning of the metal bolt 30 via the motor control electronics 65 (encoder/incremental encoder).

The control logic 61 receives input signals from the reed sensor 355 present in the exemplary embodiment as to whether or not a magnetic dipole rod 15 is currently in the receiving section 23 of the channel 21. If there is one or no magnetic dipole rod 15 in the receiving section at the wrong time, the control system 60 could respond accordingly.

FIG. 3 and FIG. 4 show the magazine 50 for the magnetic dipole rods 15 from the side and from the top, respectively. The magazine 50 is a plate made of a non-magnetic material with a top side 51 and a bottom side 52. The magazine 50 has wells 53 on its top side 51. The wells 53 are arranged in regular rows 1 ... m and columns 1 ... n. The magnetic dipole rods 15 are more or less upright in the wells 53 since the diameter A of the wells is in a range of from 110% to 220% of the diameter of the magnetic dipole rods 15. Or in other words, the diameter of the wells A is in a range of from 1 mm to 2.5 mm greater than the diameter of a magnetic dipole rod 15.

The distance of the bottom 54 of the wells from the top side 51 of the magazine 50 (=depth C) is in a range of from 0.5 mm to 2.5 mm less than the length of a magnetic dipole rod. This leads to a corresponding projection B of dipole rods 15 beyond the top side 51 of the magazine 50.

FIGS. 5*a*-5*h* show the sequence of the transfer of a magnetic dipole rod and delivery into a target container 55. The magnetic dipole rod 15 is situated in the well 53 of a magazine 50. The gripping device 10 is attached to a movable arm of a robot (not shown). The magazine 50 and the target container 55 are situated at predetermined positions in space. The metal bolt 30 is in the receiving position. The adhesion region 31 of the metal bolt 30 is situated in the region of the open end 22 of the channel 21. The connection 32 to the motor shaft 43 is resting against the stop edge 27. The arm of a robot is used to move the gripping device 10 with the open end 22 of the channel 21 over a well 53 on the magazine 50 in which there is a magnetic dipole rod 15 (FIG. 5*a*).

In the next step, the gripping device 10 is lowered by the arm of a robot, with the result that the adhesion region 31 is situated directly above a magnetic dipole rod 15. The magnetic dipole rod 15 is aligned vertically, following the magnetic force, while the adjacent magnetic dipole rod 15 is not affected (FIG. 5*b*) because of the greater distance from the metal bolt 30.

If, after a further slight lowering of the gripping device 10, the distance between the adhesion region 31 and the magnetic dipole rod 15 falls below a minimum, the magnetic dipole rod 15 adheres with its upper end to the adhesion region 31 (FIG. 5*c*).

Now the motor 42 is activated in order to retract the metal bolt 30 from the receiving position into the holding position with the aid of the motor shaft 43 and thus to bring the magnetic dipole rod 15 into the receiving section 23 of the channel 21 (FIG. 5*d*).

The magnetic sensor 35 which is present on the outside of the receiving section 23 detects the presence of the magnetic dipole rod 15 in the receiving section 23 of the channel 21 (FIG. 5*e*).

The arm of a robot now moves the gripping device 10 over the target container 55 (FIG. 5*f*).

Now the motor 42 is activated in order to retract the metal bolt 30 from the holding position into the delivery position with the aid of the motor shaft 43 (FIG. 5*g*).

While the metal bolt 30 is being retracted into the delivery position, in which the adhesion region 31 is situated in the bolt guide section 25, the magnetic dipole rod 15 strikes against the stripping edge 24 and is separated from the adhesion region 31. Following the force of gravity, the magnetic dipole rod 15 falls vertically into the target container 55. The magnetic sensor 35 detects that there is no longer a magnetic dipole rod 15 in the receiving section 23.

The receiving section 23 and the stripping edge 24 are shown on an enlarged scale in FIG. 5*i*.

The invention claimed is:
1. A gripping device for a magnetic dipole rod, having
   a housing with a channel which has an open end, the channel comprising a bolt guide section and a receiving section between the bolt guide section and the open end, the diameter of the bolt guide section is smaller than the diameter of the magnetic dipole rod, the diameter of the receiving section is matched to the magnetic dipole rod in such a way that the magnetic dipole rod can be received substantially into the receiving section, wherein the reduced diameter of the bolt guide section compared to the receiving section results in a stripping edge between the receiving section and the bolt guide section, a metal bolt made of a ferromagnetic material with a front end towards the open end of the channel and a rear end, wherein the metal bolt is mounted in the channel so as to be movable between a first position, in which the front end of the metal bolt is situated in the receiving section and a second position, in which the front end of the metal bolt is situated in the bolt guide section, wherein the stripping edge is adapted to strip off a dipole rod adhering to the front end of the metal bolt from the front end of the metal bolt when the metal bolt moves from the first position into the second position.

2. The gripping device according to claim 1, wherein the metal bolt can assume a further position, in which the front end of the metal bolt is situated outside the receiving section.

3. The gripping device according to claim 1, wherein the length of the receiving section is in a range of from 80% to 150% of the length of the magnetic dipole rod, and the diameter of the receiving section is from 102% to 120% of the diameter of the magnetic dipole rod.

4. The gripping device according to claim 1, wherein a rear end of the metal bolt is connected to a means for producing a translational movement.

5. The gripping device according to claim 4, wherein the means for producing a translational movement is a motor, optionally a linear motor, stepping motor or a servo motor with a corresponding transmission.

6. The gripping device according claim 1 wherein a rear end of the metal bolt has a widening, and the channel has a further section, the diameter and cross section of which are matched to the diameter and cross section of the widening, and the length of which is dimensioned in such a way that the metal bolt can assume the positions.

7. The gripping device according to claim 1 wherein there is a magnetic sensor on the outside of the housing in a region of the receiving section.

8. A robot having a robot arm to which the gripping device according to claim 1 is attached in a fixed or removable manner.

9. The robot according to claim 8, wherein the robot comprises a control system for controlling the robot arm and the gripping device.

10. A system for transferring a magnetic dipole rod, having a robot with a robot arm according to claim 8 and a magazine for providing one or more magnetic dipole rods, comprising a plate comprising a non-magnetic material with a top side and a bottom side, wherein the top side has one or more wells with a depth C and the diameters of the wells are matched to the one or more magnetic dipole rods in such a way that the magnetic dipole rod or rods can be received into the wells in a substantially vertical orientation.

* * * * *